United States Patent
Lee et al.

(10) Patent No.: US 9,533,287 B2
(45) Date of Patent: Jan. 3, 2017

(54) CATALYSTS FOR REFORMING HYDROCARBONS AND PRODUCTION METHODS THEREOF

(71) Applicant: Samsung Electronics Co., Ltd., Suwon-Si, Gyeonggi-Do (KR)

(72) Inventors: Seung Jae Lee, Suwon-si (KR); In Hyuk Son, Yongin-si (KR); Hyunjoo Lee, Seoul (KR); Chanyeon Kim, Seoul (KR)

(73) Assignees: Samsung Electronics Co., Ltd., Gyeonggi (KR); Yonsei University, University—Industry Foundation (UIF), Seoul (KR)

( * ) Notice: Subject to any disclaimer, the term of this patent is extended or adjusted under 35 U.S.C. 154(b) by 0 days.

(21) Appl. No.: 14/223,166

(22) Filed: Mar. 24, 2014

(65) Prior Publication Data

US 2014/0284524 A1    Sep. 25, 2014

(30) Foreign Application Priority Data

Mar. 22, 2013    (KR) .......................... 10-2013-0031084

(51) Int. Cl.
*C01B 3/24* (2006.01)
*B01J 23/755* (2006.01)
(Continued)

(52) U.S. Cl.
CPC ............ *B01J 23/755* (2013.01); *B01J 35/002* (2013.01); *B01J 35/006* (2013.01); *B01J 35/0013* (2013.01); *B01J 37/0215* (2013.01); *C01B 3/40* (2013.01); *B82Y 30/00* (2013.01); *B82Y 40/00* (2013.01); *C01B 2203/0233* (2013.01); *C01B 2203/0238* (2013.01);
(Continued)

(58) Field of Classification Search
USPC ......................................................... 423/650
See application file for complete search history.

(56) References Cited

U.S. PATENT DOCUMENTS

| 6,387,843 B1 | 5/2002 | Yagi et al. |
| 7,452,842 B2 | 11/2008 | Wakatsuki et al. |

(Continued)

FOREIGN PATENT DOCUMENTS

| JP | 2004-337659 A | 12/2004 |
| KR | 2005-0103648 A | 11/2005 |

(Continued)

OTHER PUBLICATIONS

D. Wayne Goodman, Ethane Hydrogenolysis Over Single Crystals of Nickel: Direct Detection of Structure Sensitivity; Surface Science 123 (1982) L6790-L685.*

(Continued)

*Primary Examiner* — Melvin C Mayes
*Assistant Examiner* — Kenneth Vaden
(74) *Attorney, Agent, or Firm* — Harness, Dickey & Pierce, P.L.C.

(57) ABSTRACT

A catalyst for reforming hydrocarbons may include a nickel nanoparticle having a controlled crystal facet, the controlled crystal facet being a surface of the nickel nanoparticle and including a {100} face, a {111} face, or a combination thereof. The present disclosure also relates to a production method thereof and a method of reforming hydrocarbons using the same.

20 Claims, 8 Drawing Sheets

(51) Int. Cl.
*C01B 3/40* (2006.01)
*B01J 35/00* (2006.01)
*B01J 37/02* (2006.01)
B82Y 30/00 (2011.01)
B82Y 40/00 (2011.01)

(52) U.S. Cl.
CPC ............... *C01B 2203/0261* (2013.01); *C01B 2203/1058* (2013.01); *Y02P 20/142* (2015.11)

(56) References Cited

U.S. PATENT DOCUMENTS

| | | | |
|---|---|---|---|
| 7,629,072 | B2 | 12/2009 | Cho |
| 7,655,196 | B2 | 2/2010 | Katikaneni et al. |
| 2005/0238936 | A1 | 10/2005 | Cho |
| 2006/0115389 | A1* | 6/2006 | Indech .......... 422/168 |
| 2007/0111055 | A1 | 5/2007 | Katikaneni et al. |
| 2009/0158660 | A1* | 6/2009 | Vanden Bussche et al. .......... 48/127.7 |
| 2010/0047662 | A1 | 2/2010 | Shirvanian et al. |
| 2012/0196741 | A1 | 8/2012 | Shirvanian |
| 2014/0031200 | A1 | 1/2014 | Son et al. |
| 2014/0041300 | A1 | 2/2014 | Lee et al. |
| 2014/0255500 | A1 | 9/2014 | Son et al. |
| 2014/0255781 | A1 | 9/2014 | Son et al. |

FOREIGN PATENT DOCUMENTS

| | | |
|---|---|---|
| KR | 10-0551035 B1 | 2/2006 |
| KR | 2008-0069253 A | 7/2008 |
| KR | 2014-0014869 A | 2/2014 |
| KR | 2014-0019589 A | 2/2014 |
| KR | 2014-0020492 A | 2/2014 |
| KR | 10-2014-0110703 | 9/2014 |
| KR | 10-2014-0111548 | 9/2014 |

OTHER PUBLICATIONS

Yunxi Yao et al. "Nickel Particle Size Effects on Cyclohexane Dehydrogenation: A Combined Reaction Kinetics and Surface Science Study" Catalysis Letters, Dec. 2012, vol. 142, Issue 12, pp. 1437-1444, First Online Oct. 27, 2012.*

Gonzalo Pina et al. "Nickel particle size effects in catalytic hydrogenation and hydrodechlorination: phenolic trasnformations over nickel/silica" Phys. Chem. Chem. Phys, 2003, 5, pp. 1924-1931, Online Mar. 21, 2003.*

M. Chareonpanich et al. "Effect of Nickel Particle Size on Dry Reforming Temperature," Proceedings of the World Congress on Engineering and Computer Science, Oct. 2008.*

Peng Shi et al. "Characterization of Silica Supported Nickel Catalyst for Methanation with Improved Activity by Room Temperature Plasma Treatment," Catalysis Letters, Sep. 2009.*

Ajeet Kumar et al. "Controlled synthesis of size-tunable nickel and nickel oxide nanoparticles using water-in-oil microemulsions," Adv, Nat. Sci: Nanosci. Nanotechnol. 4, p. 1-9, Apr. 19, 2013.*

Y. Du et al. "Effect of Nickel Particle Size on Alumina Supported Nickel Catalysts for p-Nitrophenol Hydrogenation," Chem. Biochem. Eng. Q. 21(3), 251-255, 2007.*

Wang, et al., "CH4 dissociation on Ni surfaces: Density functional theory study", Science Direct, Surface Science, (2006) pp. 3226-3234.

* cited by examiner

CATALYSTS FOR REFORMING HYDROCARBONS AND PRODUCTION METHODS THEREOF

CROSS-REFERENCE TO RELATED APPLICATION

This application claims priority under 35 U.S.C. §119 to Korean Patent Application No. 10-2013-0031084, filed in the Korean Intellectual Property Office on Mar. 22, 2013, the entire contents of which are incorporated herein by reference.

BACKGROUND

1. Field

The present disclosure relates to a catalyst for reforming hydrocarbons, a method of producing the same, and hydrocarbon reforming processes using the same.

2. Description of the Related Art

Hydrocarbons (such as natural gas, petroleum gas, or the like) may be reformed in the presence of a reforming material (such as carbon dioxide, water vapor, and oxygen) and a catalyst so as to be converted to hydrogen, carbon monoxide, or the like. Such reactions may be used for various purposes, for example, for hydrogen supply in fuel cells, which are considered to be an alternative energy source to fossil fuels. For example, methane in natural gas may produce hydrogen gas via a carbon dioxide reforming (CDR) reaction represented by Reaction Scheme 1 or a combined steam carbon dioxide reforming (CSCDR) reaction represented by Reaction Scheme 2.

[Reaction Scheme 1]

$$CH_4 + CO_2 \longrightarrow 2H_2 + 2CO$$

[Reaction Scheme 2]

$$0.75\,CH_4 + 0.25\,CO_2 + 0.5\,H_2O \longrightarrow 2H_2 + CO$$

Nickel catalysts may be used in such reactions of reforming hydrocarbons, but carbon deposition occurs more easily with a nickel catalyst than with a precious metal catalyst, thereby causing a serious decrease in catalyst efficiency. Conventional nickel catalysts currently being used are amorphous and have a spherical particle shape.

SUMMARY

Some example embodiments of the present disclosure relate to a catalyst for reforming hydrocarbons that includes a crystal facet-controlled catalytically active metal, thereby showing improved catalytic activity and durability.

Some example embodiments of the present disclosure relate to a method of producing the catalyst via a colloidal method.

Some example embodiments of the present disclosure relate to a method of reforming hydrocarbons using the aforementioned catalyst.

In an example embodiment, a catalyst for reforming hydrocarbons may include at least one nickel nanoparticle having at least one controlled crystal facet, the at least one controlled crystal facet being a surface of the at least one nickel nanoparticle and including a {100} face, a {111} face, or a combination thereof.

The nickel nanoparticle may have a cubic shape, a sand-glass (hourglass) shape, or a cuboctahedron shape.

When included as a plurality, the nickel nanoparticles may have a shape purity of from about 50% to about 95%.

The nickel nanoparticle may have an average size of about 10 nm to about 30 nm.

The nickel nanoparticle may be supported on a porous carrier.

Another example embodiment relates to a method of manufacturing a catalyst for reforming hydrocarbons, the catalyst including a nickel nanoparticle having at least one controlled crystal facet, the at least one controlled crystal facet being a surface of the nickel nanoparticle and including a {100} face, a {111} face, or a combination thereof. The method may include dispersing a nickel metal precursor in a first solvent to obtain a nickel metal precursor dispersion; dispersing a capping agent in a second solvent to obtain a capping agent dispersion; mixing the nickel metal precursor dispersion and the capping agent dispersion to obtain a dispersion mixture; adding a surface stabilizing agent to the dispersion mixture while stirring to obtain a surface stabilizing mixture; heating the surface stabilizing mixture under hydrogen pressure to a reaction temperature and maintaining the reaction temperature to form the nickel particle having the at least one controlled crystal facet; and magnetically separating the nickel nanoparticle having the at least one controlled crystal facet.

The nickel nanoparticle may have a cubic shape, a sand-glass (hourglass) shape, or a cuboctahedron shape.

The nickel metal precursor may be a nickel powder, an alkylated nickel compound, a nickel alkoxide, a nickel carboxylate, a nickel nitrate, a nickel perchlorate, a nickel sulfate, a nickel acetylacetonate, a nickel halide, a nickel cyanide, a nickel hydroxide, a nickel oxide, a nickel peroxide, or a combination thereof.

The dispersion mixture may have a concentration of the nickel metal precursor in a range of about 10 mM to about 20 mM.

The surface stabilizing agent may be selected from trioctyl phosphine (TOP), trioctyl phosphine oxide (TOPO), polyvinyl pyrrolidone (PVP), and a combination thereof. In the surface stabilizing mixture, a concentration of the surface stabilizing agent may be about 5 mM to about 70 mM.

The hydrogen pressure may be about 0.5 atm to about 20 atm.

The reaction temperature may be about 100° C. to about 180° C.

The dispersion mixture may be maintained at the reaction temperature for less than or equal to about 48 hours (but should be understood to be a non-zero amount of time).

The method may further include supporting the nickel nanoparticle having a controlled crystal facet on a porous carrier.

The porous carrier may include an oxide of at least one metal selected from Al, Ti, Ce, Si, and Mg.

Another example embodiment relates to a method of reforming hydrocarbons. The method may include contacting an input gas stream (including a hydrocarbon and a reforming material) with a catalyst for reforming hydrocarbons. The catalyst may include a nickel nanoparticle having at least one controlled crystal facet, the at least one controlled crystal facet being a surface of the nickel nanoparticle and including a {100} face, a {111} face, or a combination thereof.

The nickel nanoparticle may have a cubic shape, a sandglass (hourglass) shape, or a cuboctahedron shape.

The nickel nanoparticle may be supported on a porous carrier.

The porous carrier may include an oxide of at least one metal selected from Al, Ti, Ce, Si, and Mg.

The reforming material may be selected from the group consisting of water, water vapor, carbon dioxide, oxygen, air, and a combination thereof.

The contacting may be carried out at a reaction temperature of about 500° C. to about 1000° C. under a pressure of about 0.5 atm to about 30 atm.

By controlling a crystal facet of a nickel nanoparticle and a shape thereof, the catalyst including the nickel nanoparticle may exhibit higher catalytic activity.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms, "comprises," "comprising," "includes," and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

The term "input gas stream" refers to a gas stream prior to passing through a catalyst region or prior to initial contact with a catalyst composition.

The catalyst for reforming hydrocarbons according to one example embodiment includes a nickel nanoparticle having a controlled crystal facet, the controlled crystal facet being a surface of the nickel nanoparticle and including a $\{100\}$ face, a $\{111\}$ face, or a combination thereof.

In an example embodiment, nickel may form a face-centered cubic crystal, and the resulting nickel particle is controlled to have a $\{100\}$ face and/or a $\{111\}$ face among the crystal facets constituting the surface of the crystal. As a result, the crystalline nickel particle may have a cubic shape, a sandglass (hourglass) shape, or a cuboctahedron shape. When included as a plurality, the nickel nanoparticles may have shape purity of greater than or equal to about 50%, for example, about 50% to about 95%, about 65% to about 95%, or about 70% to about 95%. As used herein, the term "shape purity" refers to a percentage of the number of particles having a given shape (e.g., cubic shape) with respect to the total number of particles having a controlled shape. The nickel nanoparticle may have an average size of about 10 nm to about 30 nm.

The catalyst for reforming hydrocarbons that includes a crystal facet-controlled nickel nanoparticle may exhibit enhanced catalytic efficiency (i.e., a higher conversion rate). Without wishing to be bound by any theory, the nano-sized catalyst having a controlled shape of crystal facet may provide an active site at which reactants may undergo decomposition more quickly, thereby showing a higher level of catalytic efficiency. For example, the {100} face of the cubic-shaped nickel nanoparticle may provide a reaction site at which dissociation of the reactants (e.g., hydrocarbons such as methane and carbon dioxide) may be facilitated, and this may result in a higher conversion rate. In addition, the sandglass (hourglass) shaped nanoparticle and the cuboctahedron shaped nanoparticle, which have a {100} face and a {111} face together on its surface, may present a higher conversion rate and a lower level of carbon deposition.

The nickel nanoparticle may be supported on a porous carrier. As the porous carrier, it is possible to use an oxide of at least one metal selected from Al, Ti, Ce, Si, and Mg, alone or in a mixture of at least two oxides. Examples of the porous oxide may include, but are not limited to, alumina, titania, ceria, silica, and magnesium oxide. The porous carrier may be a mesoporous silica, a mesoporous zeolite, or an alumina aerosol. The porous carrier may have an average pore size of about 2 nm to about 50 nm and a specific surface area of about 15 to 800 $m^2/g$, for example about 20 to 500 $m^2/g$, but it is not limited thereto. The amount of the nickel nanoparticles supported on the porous carrier is not particularly limited and may be chosen appropriately. For example, the amount of the nickel nanoparticles supported on the porous carrier may be about 0.1 wt % to about 20 wt %, for example, about 1 wt % to about 15 wt %, based on a total weight of the supported type catalyst. When the nickel nanoparticles having a controlled crystal facet are supported on the porous carrier, the resulting catalyst may exhibit enhanced catalytic activity in comparison with a catalyst having conventional spherical nickel nanoparticles supported on the carrier. Moreover, the resulting catalyst is less likely to suffer catalyst degradation such as carbon deposition, sintering, or the like, thereby showing improved durability.

In another example embodiment, a method is disclosed below for manufacturing a catalyst for reforming hydrocarbons. The catalyst for reforming hydrocarbons includes a nickel nanoparticle having a controlled crystal facet. The controlled crystal facet is a surface of the nickel nanoparticle and includes a {100} face, a {111} face, or a combination thereof. The method may include dispersing a nickel metal precursor in a first solvent to obtain a nickel metal precursor dispersion. The method may additionally include dispersing a capping agent in a second solvent to obtain a capping agent dispersion; mixing the nickel metal precursor dispersion and the capping agent dispersion to obtain a dispersion mixture; adding a surface stabilizing agent to the dispersion mixture while stirring to obtain a surface stabilizing mixture; heating the surface stabilizing mixture under hydrogen pressure to a reaction temperature and maintaining the reaction temperature to form a nickel nanoparticle having a controlled crystal facet; and magnetically separating the nickel nanoparticle having the controlled crystal facet.

The nickel nanoparticle may have a cubic shape, a sandglass (or hourglass) shape, or a cuboctahedron shape.

The nickel metal precursor may be a nickel powder, an alkylated nickel compound, a nickel alkoxide, a nickel carboxylate, a nickel nitrate, a nickel perchlorate, a nickel sulfate, a nickel acetylacetonate, a nickel halide, a nickel cyanide, a nickel hydroxide, a nickel oxide, a nickel peroxide, or a combination thereof. Examples of the nickel metal precursor may include, but are not limited to, nickel acetate, nickel acetylacetonate, nickel iodide, nickel bromide, nickel chloride, nickel fluoride, nickel carbonate, nickel cyanide, nickel nitrate, nickel oxide, nickel peroxide, nickel perchlorate, and nickel sulfate. Examples of a dispersing solvent (e.g., first solvent) may be mesitylene, benzyl alcohol, octadecene, and a combination thereof.

Capping agents may be any compound playing a role of controlling a shape direction. Examples of the capping agent may be hexadecyl amine, dodecyl amine, and oleyl amine. Examples of a second solvent for dispersing the capping agent may be mesitylene, benzyl alcohol, octadecene, and a combination thereof. The second solvent for dispersing the capping agent may be the same as or different from the first solvent for dispersing the nickel metal precursor.

The dispersion of the nickel metal precursor may be mixed with the dispersion of the capping agent separately prepared to obtain a dispersion mixture. A surface stabilizing agent such as trioctyl phosphine (TOP), trioctyl phosphine oxide (TOPO), polyvinyl pyrrolidone (PVP), or a combination thereof may be added to the dispersion mixture while stirring to obtain a surface stabilizing mixture. When stirring, the temperature, the speed, and the time are not particularly limited, but may be appropriately controlled. For example, the stirring speed may be in a range of about 500 rpm to about 2000 rpm, and the stirring time may be in a range of about 1 minute to about 30 minutes. In the surface stabilizing mixture, the concentration of the nickel metal precursor may be in a range of about 10 mM to about 20 mM, for example, from about 12 mM to about 18 mM. The concentration of the surface stabilizing agent may be in a range of about 5 mM to about 70 mM, for example from about 15 mM to about 50 mM. In an example embodiment, the mole ratio among the Ni metal precursor, the surface stabilizing agent (e.g., TOP), and the capping agent (Ni metal precursor: surface stabilizing agent: capping agent) may be 3:3 to 10:20 to 40. The shape of the nickel metal particle being obtained may be controlled by adjusting the amount of the stabilizing agent with respect to the amount of the nickel metal precursor. In an example embodiment, a rod-shaped particle having an edge may be obtained by increasing the amount of the surface stabilizing agent. For example, a sandglass (hourglass) shaped particle may be prepared when the ratio between the amount the surface stabilizing agent (mole) and the amount of the nickel metal precursor (mole) is about 0.5:1 to about 1:1. A cube-shaped particle may be prepared when the ratio between the amount the surface stabilizing agent (mole) and the amount of the nickel metal precursor (moles) is about 1.1:1 to about 1.3:1. A cuboctahedron-shaped particle may be prepared when the ratio between the amount the surface stabilizing agent (moles) and the amount of the nickel metal precursor (moles) is about 1.4:1 to about 1.7:1. A rod-like particle may be prepared when the ratio between the amount the surface stabilizing agent (moles) and the amount of the nickel metal precursor (moles) is about 1.8:1 to about 3.3:1.

The surface stabilizing mixture is heated in the presence of hydrogen as a reducing agent in a closed container to conduct a reaction. During the reaction, the hydrogen pressure ranges from about 0.5 atm to about 20 atm. As the hydrogen pressure increases, the particle size may decrease. Without wishing to be bound by any theory, this is because the hydrogen gas acts as a reducing agent, facilitating the initial formation of nickel nuclei. The reaction temperature may be in a range of about 100° C. to about 180° C., but it is not limited thereto. The reaction time may be less than or equal to about 48 hours (but should be understood to be a non-zero amount of time), for example from about 12 hours to about 48 hours, or from about 18 hours to about 30 hours. As the reaction time increases, a plate-like structure may disappear.

After the reaction, the particles having a controlled crystal facet may be magnetically separated from the reacted dispersion. As used herein, the term "magnetically separated" means particles may be separated using their magnetic properties. When the particles have a controlled crystal facet and thereby their surface includes the {100} face, {111} face, or a combination thereof, they may exhibit magnetism and thus can be separated by a magnet. The nickel nanoparticles having a controlled crystal facet may be supported on a porous support. Supporting the crystal facet-controlled nickel nanoparticles on the porous support may include the following.

For instance, the supporting step may include dispersing the nickel nanoparticles in a non-polar solvent to obtain a dispersion of the nickel nanoparticles; dispersing the porous supports in a polar solvent to obtain a dispersion of the porous supports; mixing the dispersion of the nickel nanoparticles and the dispersion of the porous supports while stirring; and separating nanoparticles supported on the support from the mixture of the dispersions. The nickel nanoparticles may be present on the surface of the support as well as within the pores of the support.

The method may further include redispersing the nickel nanoparticles supported on the porous support as separated and reseparating them, and washing the reseparated nickel nanoparticles.

Examples of the nonpolar solvent for dispersing the nickel nanoparticles may include toluene, benzene, and xylene. The nonpolar solvent may be used alone or in a mixture of at least two compounds. Examples of the polar solvent for dispersing the porous support may include ethanol, methanol, butanol, and propanol. The polar solvent may be used alone or in a mixture of at least two compounds.

Details for the porous support may be the same as previously set forth above.

In the supporting process, the stirring speed, the stirring time, and the temperature of the dispersion when stirring are not particularly limited, but may be appropriately selected. For example, the stirring speed may be in a range of about 500 rpm to about 1500 rpm, the stirring time may be in a range of about 30 minutes to about 2 hours, and the stirring temperature may be in a range of about 25° C. to about 50° C. Separating the nickel nanoparticles supported on the porous support may be conducted using any suitable means. For example, it is possible to use centrifugation, membrane separation, or the like, but the separation means are not limited thereto. A solvent for redispersing the supported nickel nanoparticles may include ethanol, methanol, propanol, pentanol, or a combination thereof. Examples of the solvent used for washing the nickel nanoparticles supported on the porous support may include, but are not limited to ethanol, methanol, propanol, butanol, pentanol, and a combination thereof.

In another example embodiment, a method of reforming hydrocarbons includes contacting an input gas stream (including hydrocarbons and a reforming material) with a catalyst for reforming hydrocarbons, the catalyst including a nickel nanoparticle having a controlled crystal facet, the controlled crystal facet being a surface of the nickel nanoparticle and including a {100} face, a {111} face, or a combination thereof.

Details of the catalyst for reforming hydrocarbons and the production method thereof may be the same as previously set forth above.

The sources of hydrocarbons included in the input gas stream are not particularly limited, but may include fossil fuels such as natural gas, petroleum gas, naphtha, heavy oil, crude oils, coal, or the like; a non-fossil fuel such as a mixed biomass including crude ethanol, wood waste, and agricultural waste residue; municipal solid waste; pulp sludge; and grass straw. For example, the hydrocarbon includes methane.

The reforming material may include water (e.g., water vapor), carbon dioxide, oxygen, air, and a combination thereof.

In the input gas stream, the supply ratio of the hydrocarbon and reforming material may be adjusted in light of a $H_2/CO$ ratio, a $CH_4$ conversion rate, a $CO_2$ conversion rate, a yield, or the like, but it is not particularly limited. For example, the supplying ratio of the hydrocarbon and the reforming material may range from about 1:1 to about 1:3, as a mole ratio. The input gas stream may further include a dilute inert gas such as nitrogen or the like in addition to the hydrocarbons and reforming materials.

The contact conditions between the input gas stream and the catalyst for reforming hydrocarbons are not particularly limited as long as a gas including hydrogen is produced by the reforming reaction triggered by the contact. For example, the contact may be performed at a temperature of about 500 to about 1000° C., for example at about 600 to about 950° C., under a pressure of about 0.5 to about 30 atm, for example about 1 to about 20 atm. In addition, the gas hourly space velocity (GHSV) of the input gas stream is not particularly limited, and may be appropriately selected in light of a $CH_4$ conversion rate and a $CO_2$ conversion rate. For example, the space velocity (GHSV) of the input gas stream may be in a range of about 3000 to 100,000 ml/hr/g, and more specifically from about 5000 to 30,000 ml/hr/g.

Hereinafter, various embodiments are illustrated in more detail with reference to the following examples. However, it should be understood that the following are example embodiments and are not intended to be limiting.

EXAMPLES

Preparation of a Catalyst

Preparation Example 1

10 ml of mesitylene is put into a Teflon linered vial, and 81 mg of nickel acetylacetonate is dispersed therein to prepare a dispersion of nickel acetylacetonate. 10 ml of mesitylene is put into a vial and 805 mg of hexadecyl amine (as a capping agent) is dispersed therein to prepare a dispersion of hexadecyl amine, which is then added to the dispersion of nickel acetylacetonate and 200 μl (20 mM) of trioctyl phosphine is added thereto, and the resulting mixture is stirred at 700 rpm for 10 minutes. The resulting mixture is placed in an autoclave and is maintained at a temperature of 140° C. under hydrogen pressure of 10 atm for 12 hours. Then, the mixture is cooled to room temperature and the nanoparticles formed therein are separated using a magnet in ambient conditions from the mixture and then purified. The purification of the nanoparticles thus obtained using toluene is repeated two times.

Figure 1:
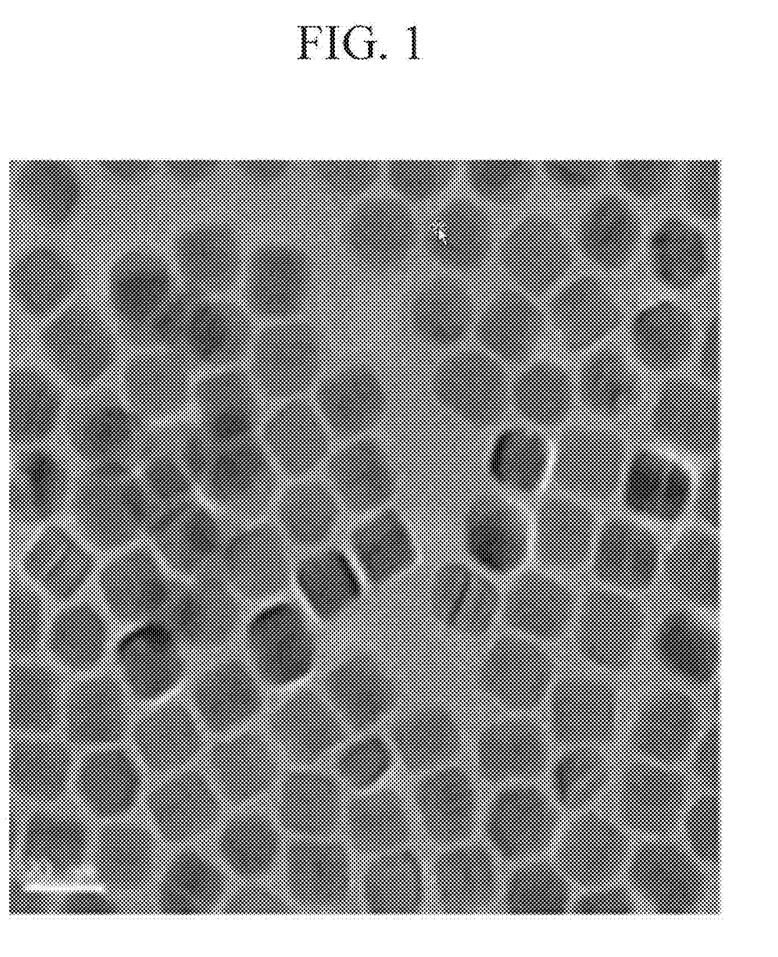
FIG. 1 is a TEM image of the nanoparticles obtained from Preparation Example 1.

It is confirmed that the nanoparticles as obtained have a cubic shape when they are observed through transmission electron microscopy (TEM). The particle purity is 71% and the size of the particles is 17±4 nm (see FIG. 1).

Preparation Example 2

Figure 2:
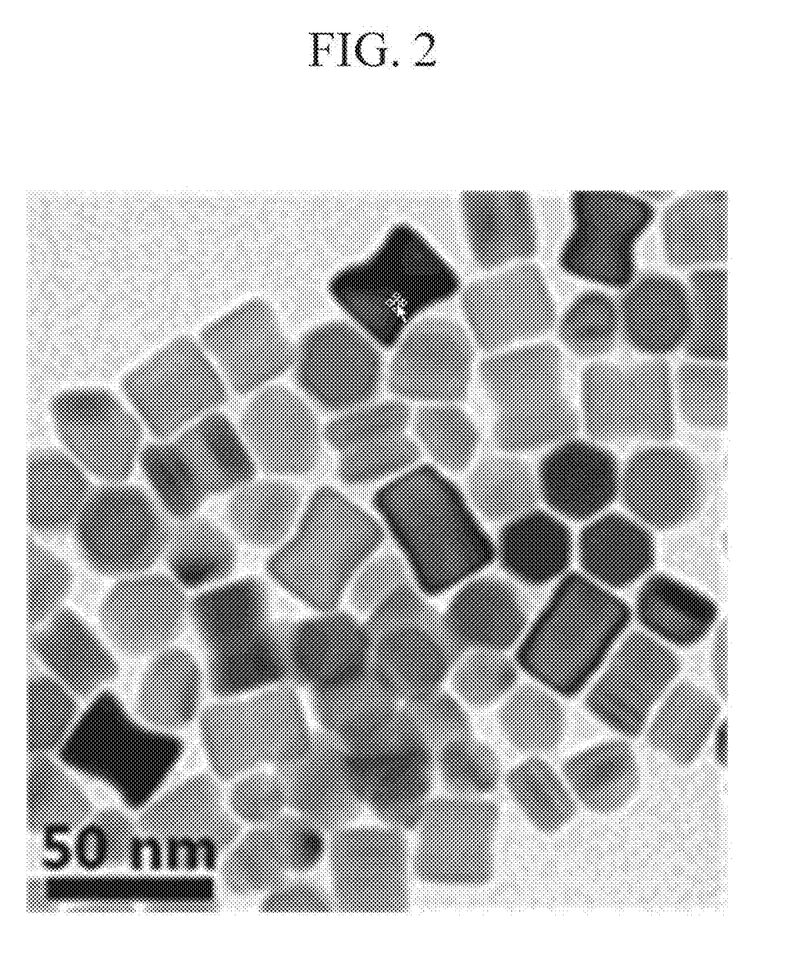
FIG. 2 is a TEM image of the nanoparticles obtained from Preparation Example 2.

Nanoparticles are prepared in the same manner set forth in Example 1, except for using 150 μl (15 mM) of trioctyl phosphine. It is confirmed that the nanoparticles as obtained have a sandglass (hourglass) shape when they are observed through transmission electron microscopy. The particle purity is 75% and the size of the particle is 24±3 nm (see FIG. 2).

Figure 3:
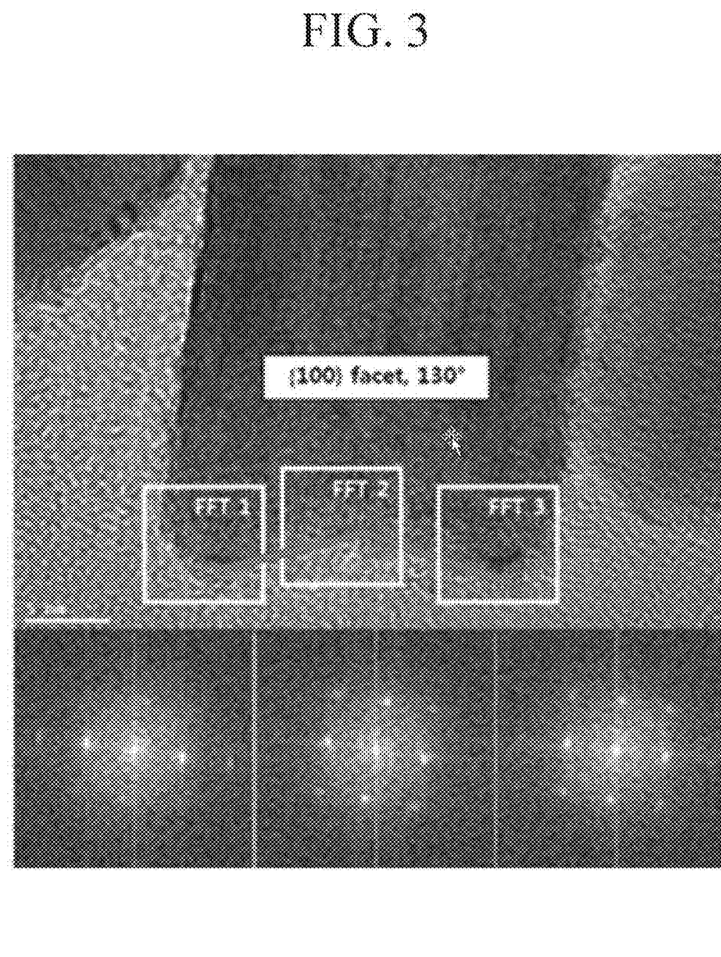
FIG. 3 is a HRTEM image of the nanoparticles obtained from Preparation Example 2.

Analysis through high resolution transmission electron microscopy (HRTEM) is undertaken for the nanoparticles thus obtained, and the results are shown in FIG. 3. As used herein, the term "sandglass shape" (or "hourglass shape") means that on each of the top and bottom sides, two {100} facets are at an angle of about 100 to 150 degrees, and the two lateral sides do not have a definitively defined crystal facet.

Preparation Example 3

Nanoparticles are prepared in the same manner set forth in Example 1, except for using 250 μl (25 mmol) of trioctyl phosphine.

Figure 4:
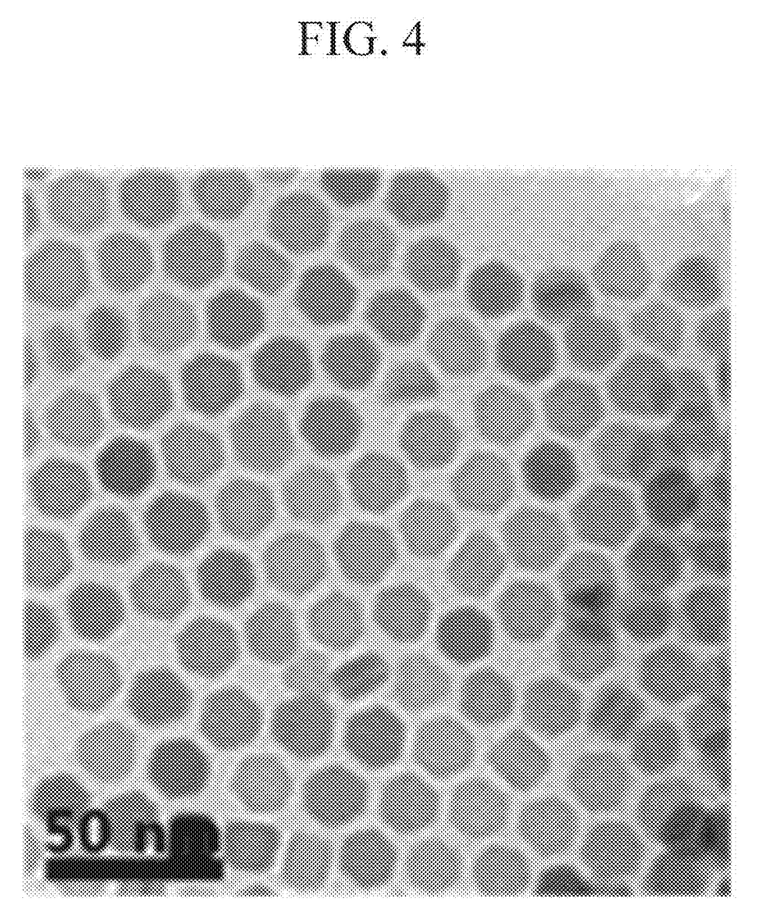
FIG. 4 is a TEM image of the nanoparticles obtained from Preparation Example 3.

It is confirmed that the nanoparticles as obtained have a cuboctahedron shape when they are observed with a transmission electron microscope. The particle purity is 78% and the size of the particle is 18±2 nm (see FIG. 4).

Figure 5:
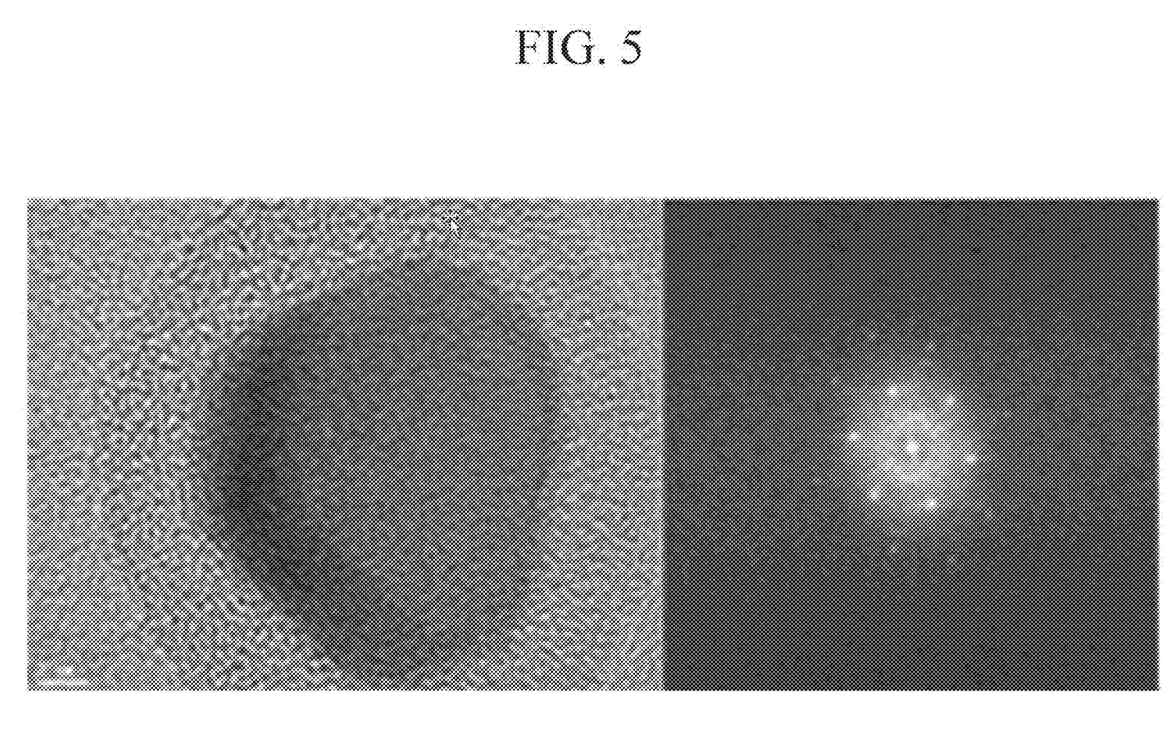
FIG. 5 is a HRTEM image of the nanoparticles obtained from Preparation Example 3.

Analysis through high resolution transmission electron microscopy (HRTEM) is undertaken for the nanoparticles thus obtained, and the results are shown in FIG. 5.

Preparation Example 4

Nanoparticles are prepared in the same manner set forth in Example 1, except for using 500 μl (50 mmol) of trioctyl phosphine.

Figure 6:
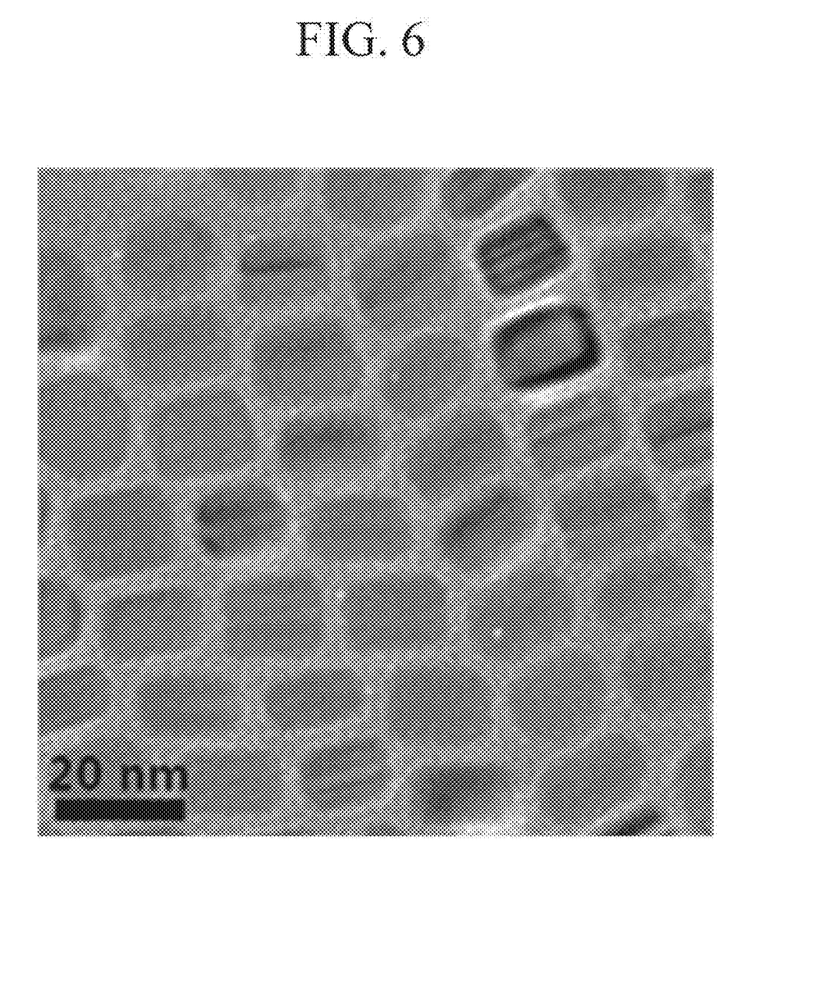
FIG. 6 is a TEM image of the nanoparticles obtained from Preparation Example 4.

It is confirmed that the nanoparticles as obtained have a rod shape when they are observed with a transmission electron microscope. The particle purity is 70% (see FIG. 6).

Comparative Preparation Example 1

After the sandglass-shaped (hourglass-shaped) nickel nanoparticles are separated in Preparation Example 2, the remaining nickel nanoparticles are collected. It is confirmed that the nanoparticles as collected do not have any specific shape when they are observed with a transmission electron microscope. The nanoparticles have a size of about 8 nm when measured with a TEM.

Comparative Preparation Example 2

After the cuboctahedron shaped nickel nanoparticles are separated in Preparation Example 3, the remaining nickel nanoparticles are collected. It is confirmed that the nanoparticles as collected do not have any specific shape when they are observed with a transmission electron microscope. The nanoparticles have a size of about 8 nm when measured with a TEM.

Preparation Example 5

Preparation of a Supported Catalyst 7.5 mg of the sandglass-shaped (hourglass-shaped) nanoparticles prepared in Preparation Example 2 are dispersed in 1 ml of toluene. 142.5 mg of γ-alumina is put into 9 ml of ethanol and stirred at 1000 rpm. The toluene dispersion of the nickel nanoparticles is added to the dispersion of γ-alumina and the mixture is stirred at 1000 rpm for 1 hour. The resulting mixed dispersion is subjected to centrifugation to obtain a supported catalyst. The supported catalyst as obtained is redispersed in ethanol and washed with ethanol three times. After being washed, the supported catalyst is filtered using a cellulose acetate membrane and then dried.

Preparation Example 6

A catalyst supported on the alumina is prepared in the same manner set forth in Preparation Example 5, except for using 7.5 mg of the cuboctahedron shaped nanoparticles prepared in Preparation Example 3.

Comparative Preparation Example 3

A catalyst supported on the alumina is prepared in the same manner set forth in Preparation Example 5, except for using 7.5 mg of nanoparticles prepared in Comparative Preparation Example 1.

Comparative Preparation Example 4

A catalyst supported on the alumina is prepared in the same manner set forth in Preparation Example 5, except for using 7.5 mg of nanoparticles prepared in Comparative Preparation Example 2.

Conducting Carbon Dioxide Reforming Reaction Using Catalyst

Example 1

Figure 7:
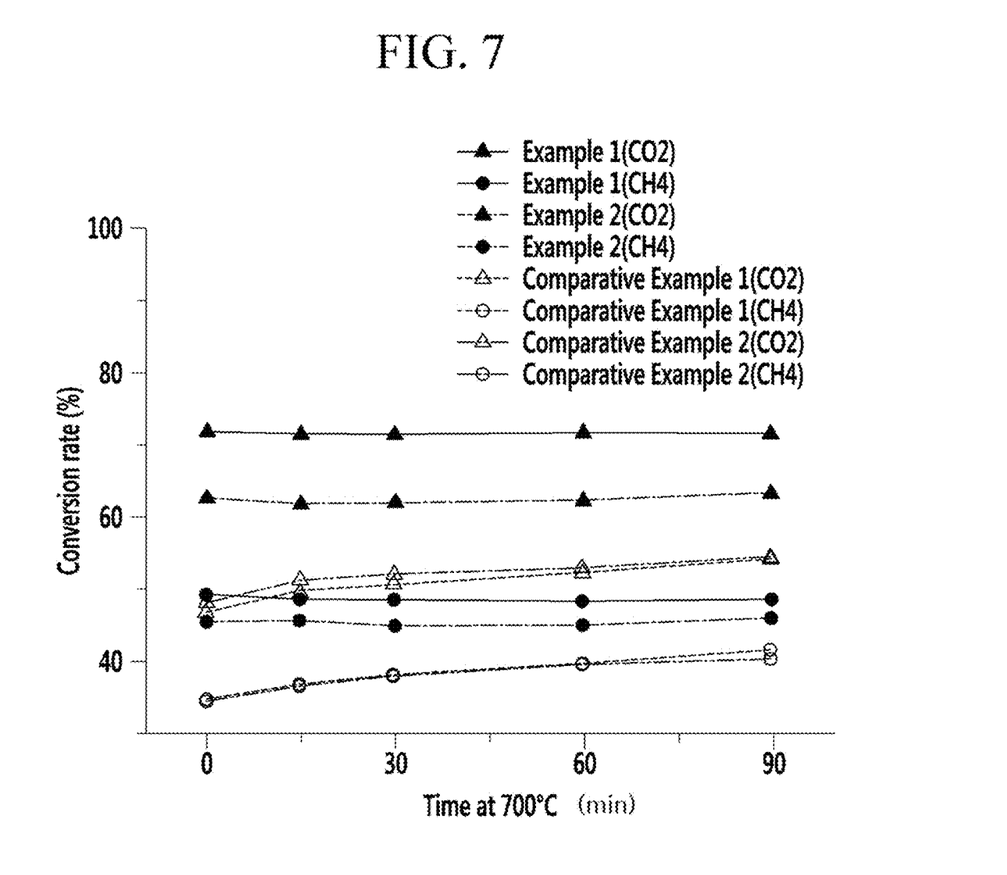
FIG. 7 shows curves plotting a carbon dioxide conversion rate and a methane conversion rate of a carbon dioxide reforming reaction conducted in Examples 1 and 2 and Comparative Examples 1 and 2.
Figure 8:
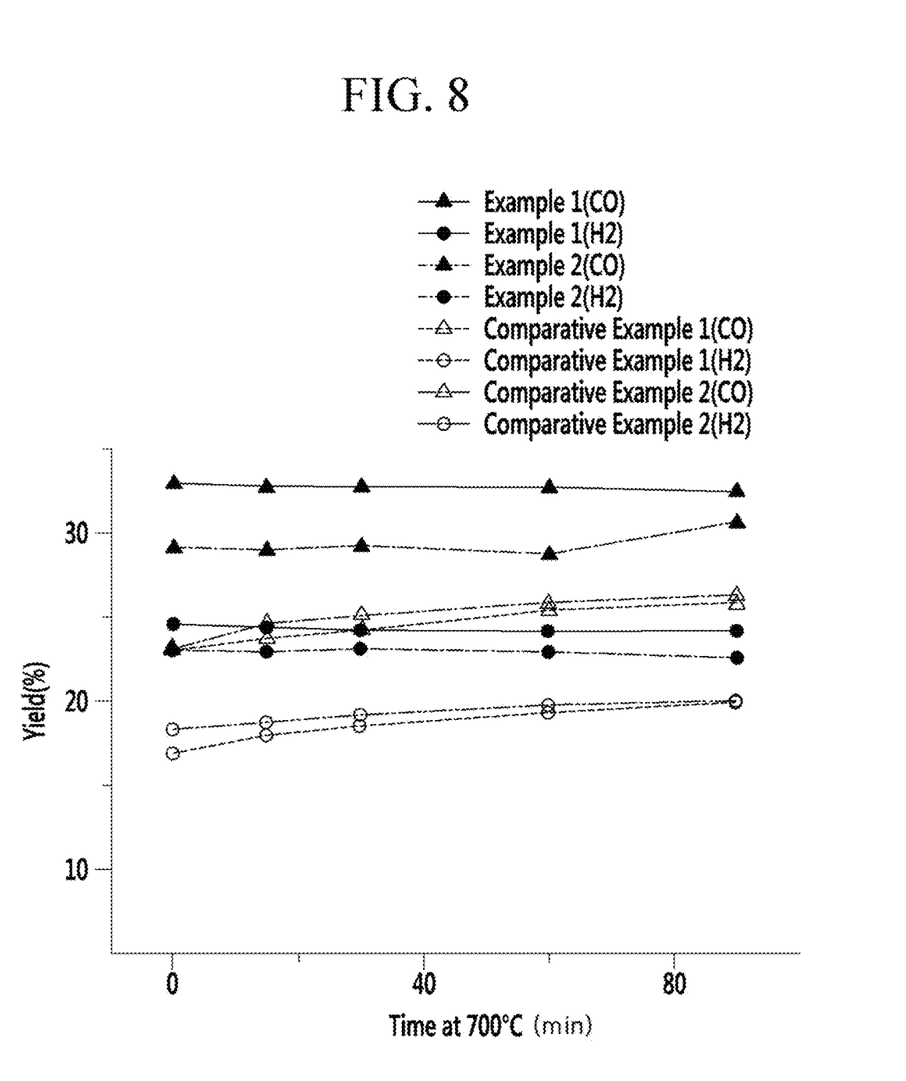
FIG. 8 shows curves plotting carbon monoxide and hydrogen conversion rates of a carbon dioxide reforming reaction in Examples 1 and 2 and Comparative Examples 1 and 2.

A carbon dioxide reforming reaction of methane is conducted in a U-shaped quartz reactor using 50 mg of the nanoparticles obtained from Preparation Example 2. The $CH_4$ conversion rate, the $CO_2$ conversion rate, the CO yield, and the hydrogen yield over time are shown in FIG. 7 and FIG. 8. After the reaction, the size of the nanoparticles is measured using a transmission electron microscope, and the results confirm that the nanoparticles after the reaction have a size of 35±4 nm.

The conditions for the $CO_2$ reforming reaction are as follows.

Reaction temperature=700° C., the flow rate of $CH_4$=5 cc/min, the flow rate of $CO_2$=5 cc/min, the flow rate of $N_2$=10 cc/min, GHSV=24,000 ml/hr/g, and the reactor is heated to the reaction temperature at a heating speed of 10° C. per minute.

Example 2

The carbon dioxide reforming reaction is conducted in the same manner set forth in Example 1, except for using 50 mg of the nanoparticles prepared from Preparation Example 3. The $CH_4$ conversion rate, the $CO_2$ conversion rate, the CO yield, and the hydrogen yield over time are shown in FIG. 7 and FIG. 8. After the reaction, the size of the nanoparticles is measured using a transmission electron microscope, and the results confirm that the nanoparticles after the reaction have a size of 26±4 nm.

Comparative Example 1

The carbon dioxide reforming reaction is conducted in the same manner set forth in Example 1, except for using 50 mg of the nanoparticles prepared from Comparative Preparation Example 1. The $CH_4$ conversion rate, the $CO_2$ conversion rate, the CO yield, and the hydrogen yield over time are shown in FIG. 7 and FIG. 8. After the reaction, the size of the nanoparticles is measured using a transmission electron microscope, and the results confirm that the nanoparticles after the reaction have a size of 50 nm.

Comparative Example 2

The carbon dioxide reforming reaction is conducted in the same manner set forth in Example 1, except for using 50 mg of the nanoparticles prepared from Comparative Preparation Example 2. The $CH_4$ conversion rate, the $CO_2$ conversion rate, the CO yield, and the hydrogen yield over time are shown in FIG. 7 and FIG. 8. After the reaction, the size of the nanoparticles is measured using a transmission electron microscope, and the results confirm that the nanoparticles after the reaction have a size of about 50 nm.

As shown in FIG. 7 and FIG. 8, the nanoparticles of Preparation Example 2 (Example 1) and Preparation Example 3 (Example 2) have a higher methane conversion rate, carbon dioxide conversion rate, CO yield, and $H_2$ yield than Comparative Preparation Examples 1 and 2. In addition, the particles of Preparation Examples 2 and 3 (Examples 1 and 2) have a significantly lower level of size increase after the reforming reaction than those of Comparative Preparation Examples 1 and 2.

While this disclosure has been described in connection with various example embodiments, it is to be understood that the disclosure is not limited to the disclosed embodiments, but, on the contrary, is intended to cover various modifications and equivalent arrangements included within the spirit and scope of the appended claims.

What is claimed is:

1. A catalyst for reforming hydrocarbons, comprising:
at least one nickel nanoparticle having at least one controlled crystal facet, the at least one controlled crystal facet being a surface of the at least one nickel nanoparticle and including a {100} face, a {111} face, or a combination thereof, the at least one nickel nanoparticle having a size ranging from 17 nm to about 30 nm, the at least one nickel nanoparticle having a cubic shape, an hourglass shape, or a cuboctahedron shape.

2. The catalyst for reforming hydrocarbons of claim 1, wherein the at least one nickel nanoparticle has the hourglass shape or the cuboctahedron shape.

3. The catalyst for reforming hydrocarbons of claim 1, wherein the at least one nickel nanoparticle is a plurality of nickel nanoparticles having a shape purity of greater than or equal to about 65%.

4. The catalyst for reforming hydrocarbons of claim 1, wherein the at least one nickel nanoparticle exhibits magnetism.

5. The catalyst for reforming hydrocarbons of claim 1, further comprising:
a porous carrier supporting the at least one nickel nanoparticle.

6. The catalyst for reforming hydrocarbons of claim 5, wherein the porous carrier comprises an oxide of at least one metal selected from Al, Ti, Ce, Si, and Mg.

7. The catalyst for reforming hydrocarbons of claim 5, wherein the at least one nickel nanoparticle supported on the porous carrier is present at about 0.1% by weight to about 20% by weight based on a total weight of the catalyst.

8. A method of manufacturing the catalyst for reforming hydrocarbons of claim 1, the method comprising:
dispersing a nickel metal precursor in a first solvent to obtain a nickel metal precursor dispersion;
dispersing a capping agent in a second solvent to obtain a capping agent dispersion;
mixing the nickel metal precursor dispersion and the capping agent dispersion to obtain a dispersion mixture;
adding a surface stabilizing agent to the dispersion mixture while stirring to obtain a surface stabilizing mixture;
heating the surface stabilizing mixture under hydrogen pressure to a reaction temperature and maintaining the reaction temperature to form the at least one nickel nanoparticle having the at least one controlled crystal facet; and
magnetically separating the at least one nickel nanoparticle having the at least one controlled crystal facet, the at least one nickel nanoparticle having a size ranging from 17 nm to about 30 nm.

9. The method of claim 8, wherein the at least one nickel nanoparticle has the hourglass shape or the cuboctahedron shape.

10. The method of claim 8, wherein the dispersing a nickel metal precursor comprises dispersing a nickel powder, an alkylated nickel compound, a nickel alkoxide, a nickel carboxylate, a nickel nitrate, a nickel perchlorate, a nickel sulfate, a nickel acetylacetonate, a nickel halide, a nickel cyanide, a nickel hydroxide, a nickel oxide, a nickel peroxide, or a combination thereof.

11. The method of claim 8, wherein the mixing includes introducing an amount of the nickel metal precursor dispersion such that a concentration of the nickel metal precursor in the dispersion mixture ranges from about 10 mM to about 20 mM.

12. The method of claim 8, wherein the adding includes selecting the surface stabilizing agent from trioctyl phosphine (TOP), trioctyl phosphine oxide (TOPO), polyvinyl pyrrolidone (PVP), and a combination thereof, a concentration of the surface stabilizing agent in the surface stabilizing mixture ranging from about 5 mM to about 70 mM.

13. The method of claim 8, wherein the heating includes supplying hydrogen such that the hydrogen pressure is about 0.5 atm to about 20 atm.

14. The method of claim 8, wherein the heating includes increasing an initial temperature to the reaction temperature such that the reaction temperature is about 100° C. to about 180° C.

15. The method of claim 8, wherein the maintaining includes the surface stabilizing mixture being subjected to the reaction temperature for less than or equal to about 48 hours.

16. The method of claim 8, further comprising:
supporting the at least one nickel nanoparticle having at least one controlled crystal facet on a porous carrier.

17. The method of claim 16, wherein the supporting includes the porous carrier including an oxide of at least one metal selected from Al, Ti, Ce, Si, and Mg.

18. The method of claim 16, wherein the supporting the at least one nickel nanoparticle comprises:
dispersing the at least one nickel nanoparticle in a nonpolar solvent to obtain a nickel nanoparticle dispersion;
dispersing the porous carrier in a polar solvent to obtain a porous carrier dispersion;
mixing the nickel nanoparticle dispersion and the porous carrier dispersion while stirring to obtain a supporting mixture including a supported nanoparticle; and separating the supported nanoparticle from the supporting mixture.

19. A method of reforming hydrocarbons, comprising:
contacting an input gas stream with the catalyst for reforming hydrocarbons of claim 1, the input gas stream including a hydrocarbon and a reforming material.

20. The catalyst for reforming hydrocarbons of claim 3, wherein the at least one nickel nanoparticle is a plurality of nickel nanoparticles having a shape purity of about 70% to about 95%.

* * * * *